United States Patent
Blume

(10) Patent No.: US 8,141,849 B1
(45) Date of Patent: Mar. 27, 2012

(54) VALVE BODY AND SEAL ASSEMBLY

(76) Inventor: George H. Blume, Austin, TX (US)

( * ) Notice: Subject to any disclaimer, the term of this patent is extended or adjusted under 35 U.S.C. 154(b) by 394 days.

(21) Appl. No.: 12/539,652

(22) Filed: Aug. 12, 2009

Related U.S. Application Data

(63) Continuation-in-part of application No. 12/390,516, filed on Feb. 23, 2009, now Pat. No. 7,591,450, which is a continuation-in-part of application No. 11/219,261, filed on Sep. 2, 2005, now Pat. No. 7,513,483, which is a continuation-in-part of application No. 10/179,804, filed on Jun. 25, 2002, now Pat. No. 6,955,181, which is a continuation-in-part of application No. 09/836,043, filed on Apr. 16, 2001, now abandoned.

(51) Int. Cl.
*F16K 1/00* (2006.01)
*F16K 15/00* (2006.01)
(52) U.S. Cl. .................. 251/332; 251/333; 137/516.29
(58) Field of Classification Search .................. 251/318, 251/332, 333, 358; 137/516.29
See application file for complete search history.

(56) References Cited

U.S. PATENT DOCUMENTS

| | | | |
|---|---|---|---|
| 4,307,140 A | 12/1981 | Davis |
| 4,518,329 A | 5/1985 | Weaver |
| 4,676,481 A | 6/1987 | Hayes |
| 4,842,287 A | 6/1989 | Weeks |
| 4,860,995 A | 8/1989 | Rogers |
| 5,052,435 A | 10/1991 | Crudup et al. |
| 5,088,521 A | 2/1992 | Johnson |
| 5,193,577 A | 3/1993 | de Koning |
| 5,249,600 A | 10/1993 | Blume |
| 5,345,965 A | 9/1994 | Blume |
| 5,538,029 A | 7/1996 | Holtgraver |
| 6,189,894 B1 | 2/2001 | Wheeler |

*Primary Examiner* — John Fristoe, Jr.

(57) ABSTRACT

A valve body and seal assembly comprises a valve body symmetrical about a longitudinal axis and comprising a circumferential seal retention groove and a frusto-conical valve body impact area for contacting a valve seat. An elastomeric seal is cast-in-place in the circumferential seal retention groove. Each seal comprises first and second seal sections in contact via an intra-seal interface, the interface simultaneously extending radially outward and longitudinally. First seal sections may comprise a first polyurethane having a higher modulus than a second polyurethane of which second seal sections may be comprised. First seal sections are cast and partially cured in a mold which is rotating about the longitudinal axis. Second seal sections are cast after the first seal sections are partially cured, resulting in the intra-seal interface shape described above. Cross-linking between first and second seal sections across the intra-seal interface is thus facilitated.

10 Claims, 7 Drawing Sheets

US 8,141,849 B1

VALVE BODY AND SEAL ASSEMBLY

This is a continuation-in-part patent application (CIP) of U.S. Ser. No. 12/390,516, which was filed Feb. 23, 2009; which was a CIP of U.S. Ser. No. 11/219,261, which was filed Sep. 2, 2005 (now U.S. Pat. No. 7,513,483); which was a CIP of U.S. Ser. No. 10/179,804 which was filed Jun. 25, 2002 (now U.S. Pat. No. 6,955,181); which was a CIP of U.S. Ser. No. 09/836,043 which was filed Apr. 16, 2001 (now abandoned).

FIELD OF THE INVENTION

The present invention relates generally to valves suitable for abrasive fluids under high pressures.

BACKGROUND

Valve terminology varies according to the industry (e.g., pipeline or oil field service) in which the valve is used. In some applications, the term "valve" means just the moving element, whereas in other applications the term "valve" includes the moving element, the valve seat, and the housing that contains the moving element and the valve seat. In the following disclosure, a valve suitable for high-pressure abrasive fluids, such as oil field drilling mud, comprises a valve body and seal assembly (the moving element) and a corresponding valve seat.

A valve body and seal assembly typically incorporates an elastomeric seal within a circumferential seal retention groove of the valve body. Such valve body and seal assemblies are commonly found in valves mounted in the fluid end of a high-speed pump incorporating positive displacement pistons or plungers in multiple cylinders (e.g., a mud pump). If preformed seals are to be used, such a groove requires finish machining to closely match the dimensions of seals like the "snap-on" type or seals secured with a removable seal retention plate.

Such groove finish machining may be reduced or eliminated if an elastomer (characterized when cured by a durometer or hardness value and/or a modulus) is cast and cured in the groove (herein "cast-in-place") to form a single-durometer seal. Further, cast-in-place seals may be mechanically locked to a valve body by forming them over interengaging or interlocking (herein "interdigitating") projecting-receiving formations on the valve body. Such interdigitation of valve body and seal has become a common structural feature of cast-in-place seals that is difficult or impossible to find in "snap-on" type seals. But manufacture of valve bodies with interdigitating cast-in-place seals has historically involved added costs. These added costs arose because the seals are preferably bonded to a valve body to increase overall integrity. Such bonding creates new problems associated with stress in the seal elastomer.

Even though the manufacturing cost of valve bodies for bonded cast-in-place seals is almost identical to the analogous cost of valve bodies for "snap-on" seals, the added cost of preparing a valve body for bonding increases the cost of the valve to the point that valves with bonded seals have not been competitive on price. The added costs of bonding include cleaning the valve groove of all oil and contaminants, applying a bonding adhesive, and storing the valves in a low-humidity, dust-free environment while the valves await casting, bonding, and curing of the seal material (typically polyurethane) on the valve body. Proper care in these steps may moderate subsequent stress-related damage to the seal and/or the valve body itself (especially the valve body flange).

Valve body flange stresses (and the associated fatigue failures) may be reduced to a limited extent, and valve sealing improved, by a properly-placed elastomeric seal which contacts the valve seat sealing surface evenly on closure (just before contact of the valve body impact area with the valve seat sealing surface). Improper placement of this seal, however, leads to an out-of-round condition that may actually increase leaks and hasten valve failure. Each leak of high-pressure fluid tends to literally wash away a portion of the hardened steel of a valve body and/or valve seat. Multiple and near-simultaneous failures of this kind in web-seat stem-guided valves may give a failed valve body flange the appearance of a wrinkled cupcake paper.

Further, leaks due to poor placement of cast-in-place elastomeric seals often occur secondary to failure of the elastomer adjacent to the special adhesive that bonds the seal to the seal retention groove. If a portion of the seal is tightly bonded to the groove wall, residual shrinkage stress within the seal elastomer will increase as the elastomer cures because the seal as a whole tends to shrink away from substantially radially-extending walls to which it is bonded. Deleterious effects of this residual elastomer shrinkage stress (i.e., elastomer stress that is present even when the seal is not in contact with a valve seat) may be significantly aggravated when combined with the elastomer stresses (see below) which arise when a valve body and seal assembly is closing against its valve seat. The resulting combined elastomer stress tends to reduce the service life of the seal by predisposing it to shear-related fatigue failures (e.g., cracking, tearing and/or extrusion).

Shear-related fatigue failure is common in the portion of an elastomeric seal that would be subject to extrusion as the valve body mates with the valve seat. The requirement that a valve seal make contact with the valve seat just prior to metal-to-metal contact between the valve body impact area and the valve seat sealing surface means that the seal elastomer is subjected to strong pressure forces as the valve is closing. Additionally, since movement of the seal against the valve seat is restricted by friction, by the metal of the valve body impact area, and by the valve seat itself, a portion of the seal elastomer tends to be extruded into the extrusion gap (between the valve body impact area and the valve seat) as the seal slides down the face of the valve seat on valve closing. Thus, a portion of the seal tends to be repeatedly deformed by this extrusion process each time the valve closes. Sliding shear stress due to this deformation combines with the residual elastomer shrinkage stress and pressure shear stress noted above to precipitate premature failures due to stress-related damage.

SUMMARY

The invention relates to a valve body and seal assembly with improved resistance to stress-related seal damage. Such an assembly comprises a valve body substantially symmetrical about a longitudinal axis, the valve body comprising a circumferential seal retention groove and a frusto-conical valve body impact area for contacting a valve seat. An elastomeric seal is cast-in-place in the circumferential seal retention groove.

In an illustrated embodiment, the elastomeric seal comprises first and second seal sections substantially symmetrical about the longitudinal axis. The first seal section comprises a first polyurethane and has a frusto-conical external surface portion for contacting a valve seat. The second seal section contacts the first seal section via a substantially smooth intra-seal interface. At least a portion of the second seal section lies between a portion of the circumferential seal retention groove and at least a portion of the first seal section. The second seal section comprises a second polyurethane having a lower modulus than the first polyurethane, and the intra-seal interface simultaneously extends radially outward and longitudinally. The intra-seal interface is thus non-planar and may comprise one or more curved portions when viewed (in cross-section) in a plane containing the longitudinal axis. Such curved portions, when present, are variable in slope and length, and they result from the method of making a seal as described herein.

Variation is also present in the thickness of the intra-seal interface in alternate embodiments of the illustrated seal. This variation, again, depends on control of parameters inherent in the method of making the seal as described herein. Thickness variation within the intra-seal interface may be a function of the degree of cross-linking present between the first and second polyurethanes of the respective seal sections.

The illustrated embodiment may be compared and contrasted with other seal assemblies that incorporate two polyurethane compositions having different moduli (commonly described using the term dual-durometer). The use of two elastomers of different moduli implies that the two elastomers exhibit different hardness (or durometer values), the higher hardness (higher durometer value) being associated with the higher modulus elastomer. See, e.g., dual-durometer urethane seals such as the Dual-Duro (R) by Southwest Oilfield Products, Inc. and Green Duo dual-durometer products offered by National Oilwell Varco, Inc.). Such commercial dual-durometer seals are relatively difficult and expensive to produce with uniformly predictable characteristics. In particular, failure of the seal bonds at the substantially planar interfaces typically found between harder and softer seal elastomers has caused failure of entire seals.

But the dual-durometer valve body and seal assemblies described herein are significantly less susceptible to failure due to problems with a bond between their first and second seal sections. Indeed, certain valve body and seal assembly embodiments described herein do not even require such a bond. Rather, other reasons underlie the long service lives of valve body and seal assemblies described herein, among these reasons being the synergistic functions associated with the geometries of first and second seal sections and the corresponding valve body.

For example, in the valve body and seal assemblies described herein, the intra-seal interface is substantially non-planar. Being substantially non-planar means that the intra-seal interface may comprise at least one portion as described above (i.e., a portion appearing curved when viewed in cross-section in a plane containing the longitudinal axis). Further, one or more such portions of certain intra-seal interface embodiments may approximate a surface area substantially geometrically similar to the frusto-conical portion of the first seal section. Thus force secondary to valve closure, which is transmitted via the first seal section to the second seal section, tends to cross such substantially geometrically similar areas substantially normally. This orientation of the transmitted force tends to minimize shear forces at the intra-seal interface, with consequent reduced probability of shear-related seal failure at the interface. The transmitted force may then be hydraulically redistributed within the second seal section to facilitate relatively nondestructive absorption and dissipation of the shock force of valve closure.

In any embodiment of a valve body and seal assembly described herein, the second seal section may be cast-in-place after the first seal section is partially cured. When the second seal section is subsequently cast-in-place, first and second seal sections will tend to cure together and thus shrink together. Relatively less residual shrinkage stress will then be generated at the intra-seal interface, compared to the case where one seal section is substantially fully cured before the other seal section is cast. Relatively lower residual shrinkage stresses, in turn, will tend to allow the first and second seal sections to remain in contact along the intra-seal interface during valve operation, causing both sections of the seal assembly to function effectively as a unit while conferring benefits from the differing characteristics of the assembly components.

In the dual-durometer valve body and seal assemblies described herein, the relatively higher modulus (i.e., harder) elastomers suitable for the first seal section typically exhibit good abrasion and extrusion resistance but relatively little preload memory to facilitate their sealing against a valve seat. The first seal section frusto-conical external surface portion experiences repeated direct initial contact with a valve seat just prior to contact of the valve seat with the valve body impact area (the first seal section frusto-conical external surface portion projecting slightly beyond the valve body impact area before contact with a valve seat). This initial contact exposes the first seal section to forces substantially normal to the valve seat as well as shear forces substantially parallel to the direction of travel as the first seal section slides slightly down the valve seat sealing surface. The sliding motion tends to extrude and also to wear the first seal section because of abrasive particulate matter trapped between the first seal section and the valve seat sealing surface. But the relative hardness of the first seal section tends to minimize abrasion and extrusion damage to the seal elastomer.

Note that the maintenance of beneficial preload by the presence of the second seal section acting through the intra-seal interface allows the use of unusually hard (i.e., relatively high durometer value) elastomers in the first seal section of embodiments of valve body and seal assemblies described herein. While such relatively hard first seal section elastomers have little preload memory themselves, they nevertheless demonstrate maintenance of sufficient preload in use due to the persistent influence of preload force transmitted across the intra-seal interface from the corresponding second seal sections (with their lower durometer values and consequently relatively better preload memory). The relatively hard first seal section elastomers, in turn, exhibit exceptional extrusion and abrasion resistance.

Such first seal section resistance to extrusion and/or abrasion damage is substantially greater than would be expected in a single-durometer or dual-durometer seal with a planar interface between seal sections. This damage reduction is achieved because elastomers for the second seal section are chosen to be relatively softer (i.e., have lower modulus) than elastomers for the first seal section. Being softer, these second seal section elastomers also exhibit relatively greater accommodation (through slight temporary distortion) of sliding movements of the first seal section. At the same time, these second seal section elastomers have better memory than first seal section elastomers for beneficial preload. As described herein, the resulting cast-in-place dual-durometer seals have synergistic combinations of functional structures and desirable performance characteristics that are not found in other seals, whether single-durometer or dual-durometer.

While the magnitude of the first seal section beneficial preload may decrease over time due to frictional wear and shear-related fatigue of the first seal section elastomer, the magnitude of the beneficial preload decrease will tend to be moderated because the second seal section is substantially protected from both frictional wear and shear-related fatigue by the presence of the first seal section. Thus, the first and second seal sections will function synergistically to maintain an effective preload level necessary for sealing efficiency throughout the service life of the valve body and seal assemblies described herein.

The synergistic seal function noted above represents an improvement in elastomeric seal performance over that obtainable with a seal that comprises a single seal section that is cast-in-place and cured in direct contact with a valve body or an analogously-shaped mold (i.e., a single-durometer seal). In such a single-durometer seal, relatively high residual preload associated with elastomer shrinkage would tend to develop in the seal elastomer as it cures. Such residual preload initially is useful for improving sealing against a valve seat sealing surface. But this benefit tends to diminish rapidly in use. Instead of maintaining adequate preload, the substantial frictional wear and shear-related fatigue experienced by the seal during high-pressure pumping tends to soften the seal elastomer and leave it with little memory of the earlier-developed beneficial preload.

In contrast, the dual-durometer valve body and seal assemblies described herein include the presence of a relatively compliant second seal section, at least a portion of which lies between a portion of the first seal section and the valve body's circumferential seal retention groove. The higher compliance of the second seal section tends to be associated with better memory of the beneficial preload developed within it during curing. So even though the first seal section tends to lose much of its initial preload due to shear-related fatigue and wear, the second seal section preload is substantially maintained and continues to be transmitted substantially normally across at least a portion of the intra-seal interface to facilitate effective sealing of a first seal section against a valve seat.

In certain of the several embodiments of a valve body and seal assembly described herein, the first seal section first polyurethane may not be bonded with the second seal section second polyurethane at the intra-seal interface because of the relatively small shear forces transmitted across the interface. Alternatively, the first seal section first polyurethane may be bonded (e.g., with a bonding agent or by cross-linking) with the second seal section second polyurethane at the intra-seal interface. Further, the first seal section may, or alternatively, may not additionally comprise a cylindrical external surface portion. Still further, the first seal section may comprise polyurethane of about 95 durometer Shore A hardness to about 60 durometer Shore D hardness, and the second seal section may comprise polyurethane of about 75 to about 85 durometer Shore A hardness.

Any of the several embodiments of a valve body and seal assembly described herein may also comprise a second seal section which itself comprises at least one external surface portion, or alternatively, comprises no external surface portion. Further, a valve may comprise any of the several embodiments of a valve body and seal assembly described herein, plus a corresponding valve seat.

DETAILED DESCRIPTION

Figure 1:
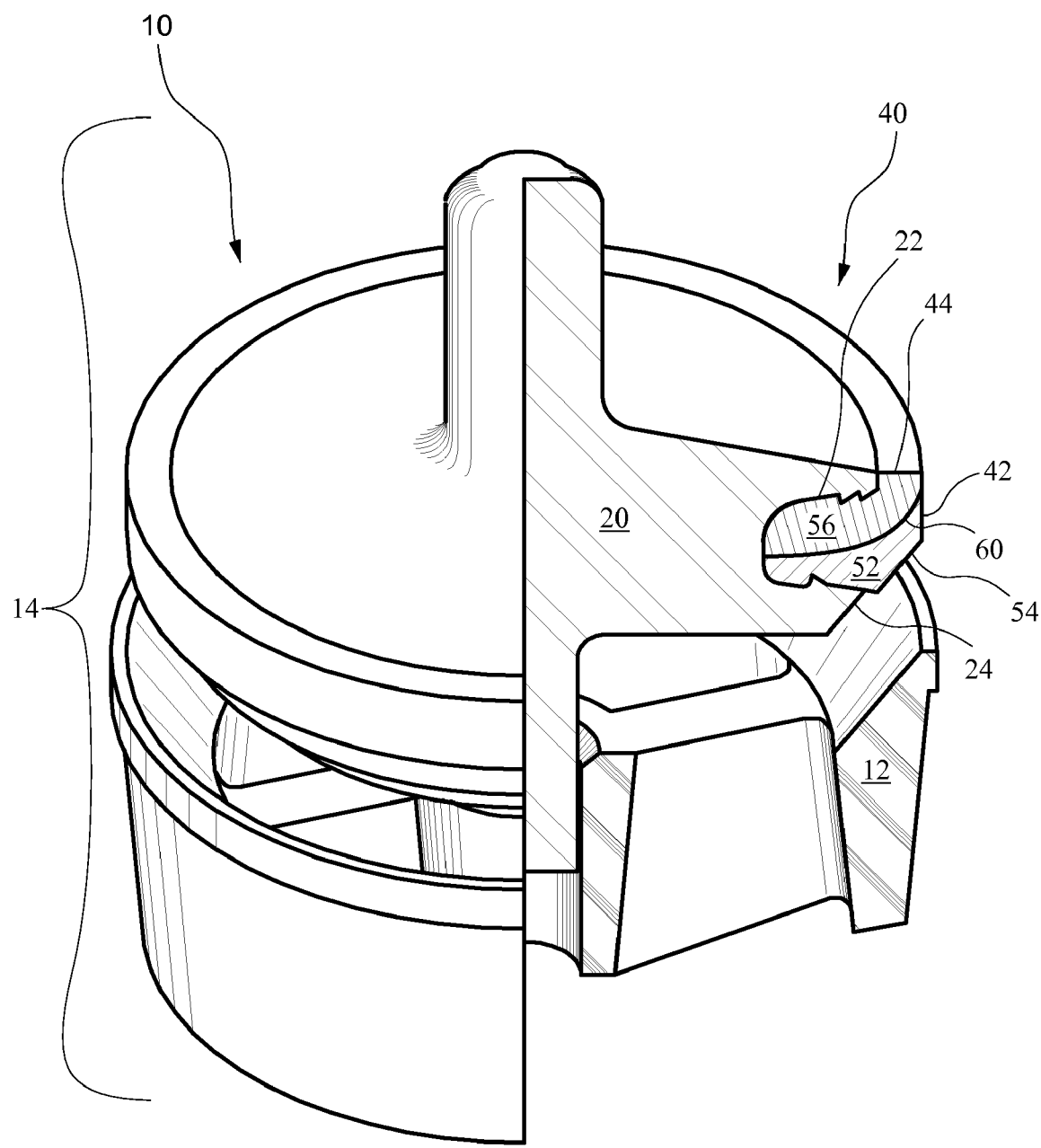
FIG. 1 schematically illustrates a partial cross-section of a stem-guided valve comprising a valve body and seal assembly plus a corresponding valve seat.

FIG. 1 schematically illustrates a partial cross-section of a stem-guided valve 14 comprising a valve body and seal assembly 10 plus a corresponding valve seat 12. Valve body and seal assembly 10 comprises a valve body 20 substantially symmetrical about a longitudinal axis, valve body 20 comprising a circumferential seal retention groove 22 and a frusto-conical valve body impact area 24 for contacting a valve seat (e.g., valve seat 12). An elastomeric seal 40 is cast-in-place in circumferential seal retention groove 22.

In the illustrated embodiment of FIG. 1, elastomeric seal 40 comprises first and second seal sections 42 and 44 respectively, each seal section being substantially symmetrical about the longitudinal axis. First seal section 42 comprises a first polyurethane 52 and has a frusto-conical external surface portion 54 for contacting a valve seat (e.g., valve seat 12). Second seal section 44 contacts first seal section 42 via a substantially smooth intra-seal interface 60. At least a portion of second seal section 44 lies between a portion of circumferential seal retention groove 22 and at least a portion of first seal section 42. Second seal section 44 comprises a second polyurethane 56 having a lower modulus than first polyurethane 52, and intra-seal interface 60 simultaneously extends radially outward (from the longitudinal axis) and longitudinally. Intra-seal interface 60 is thus non-planar and may comprise one or more curved portions when viewed (in cross-section) in a plane containing the longitudinal axis (see, e.g., FIG. 1). Such curved portions, when present, are variable in slope and length, and they result from the method of making a seal as described herein.

Figure 2A:
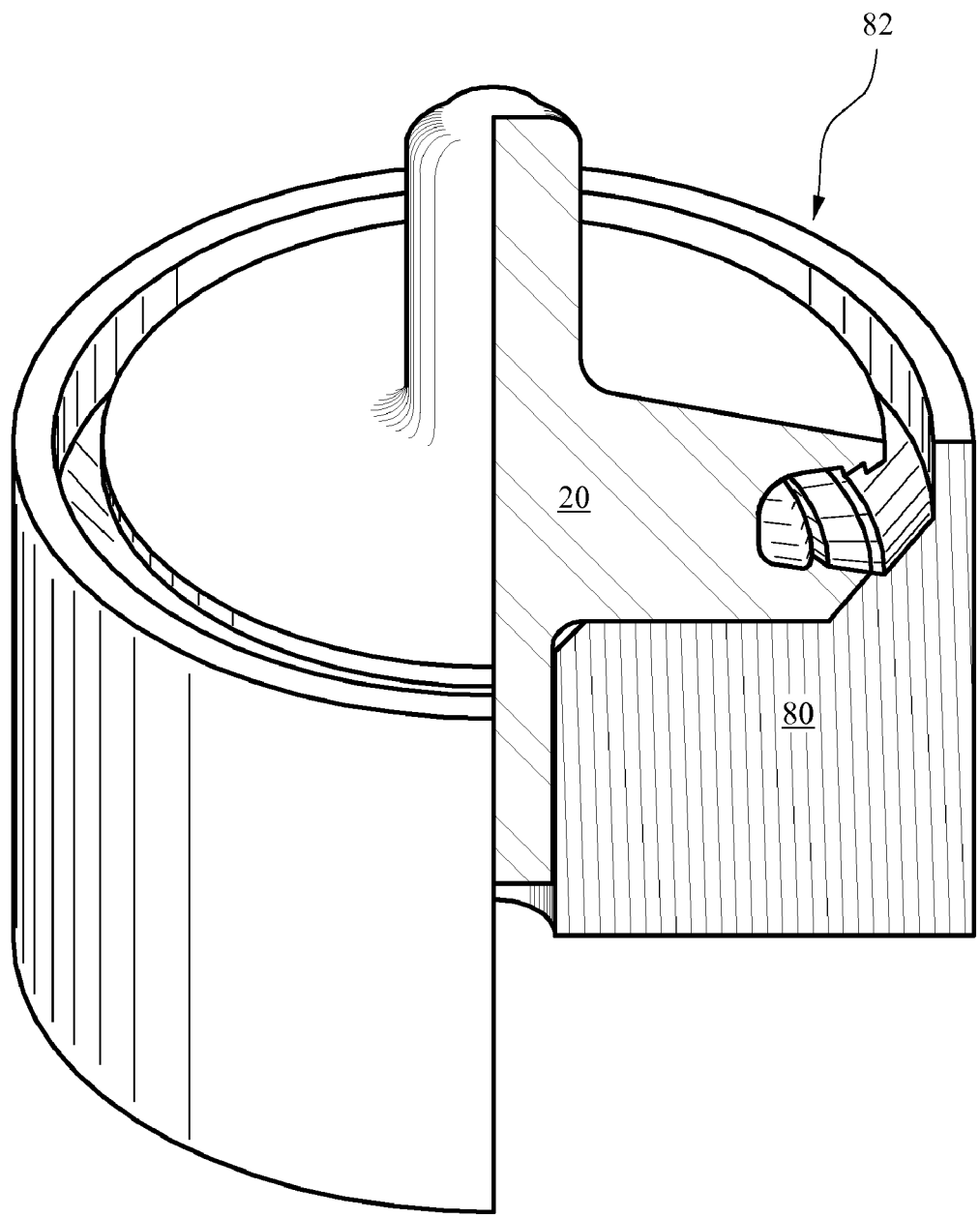
FIG. 2A schematically illustrates a partial cross-section showing a mold for making the valve body and seal assembly of FIG. 1, the mold comprising a mold shell reversibly coupled with a valve body.
Figure 2B:
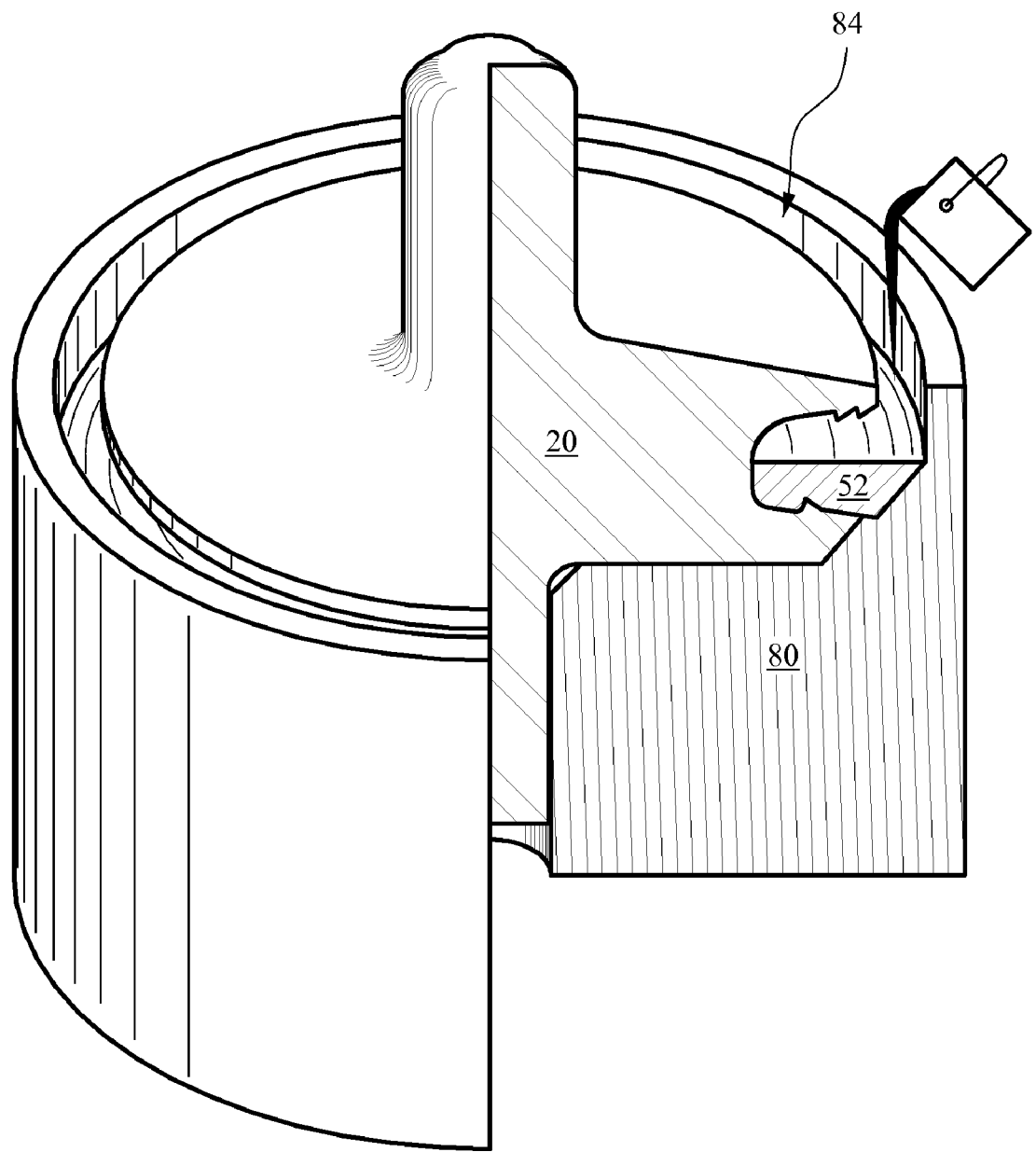
FIG. 2B schematically illustrates a partial cross-section showing initial placement of a (liquid) first polyurethane for a first seal section in the mold of FIG. 2A.
Figure 3:
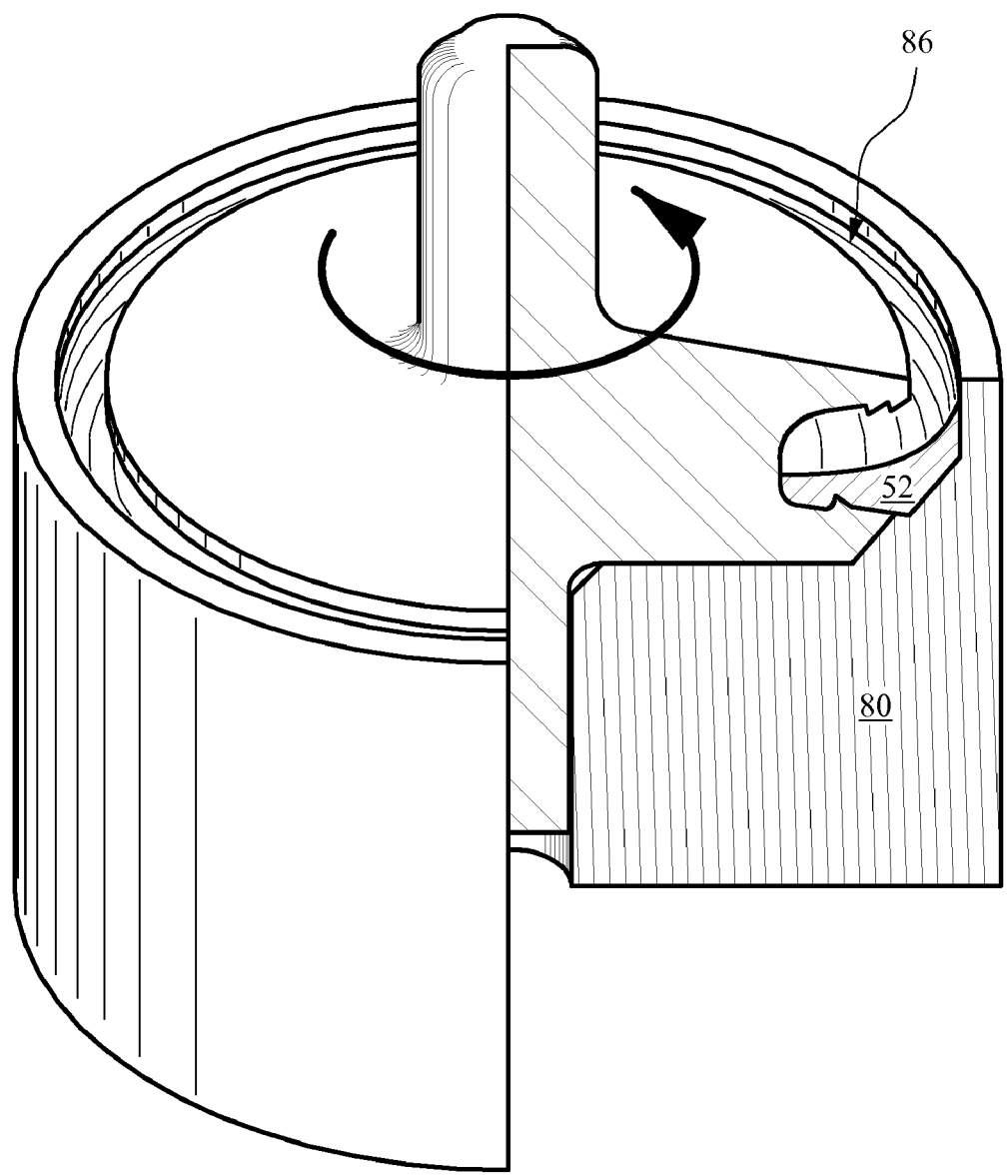
FIG. 3 schematically illustrates a partial cross-section showing redistribution of a (liquid) first polyurethane for a first seal section in the mold of FIG. 2A, the mold being rotated about the valve body longitudinal axis.
Figure 4:
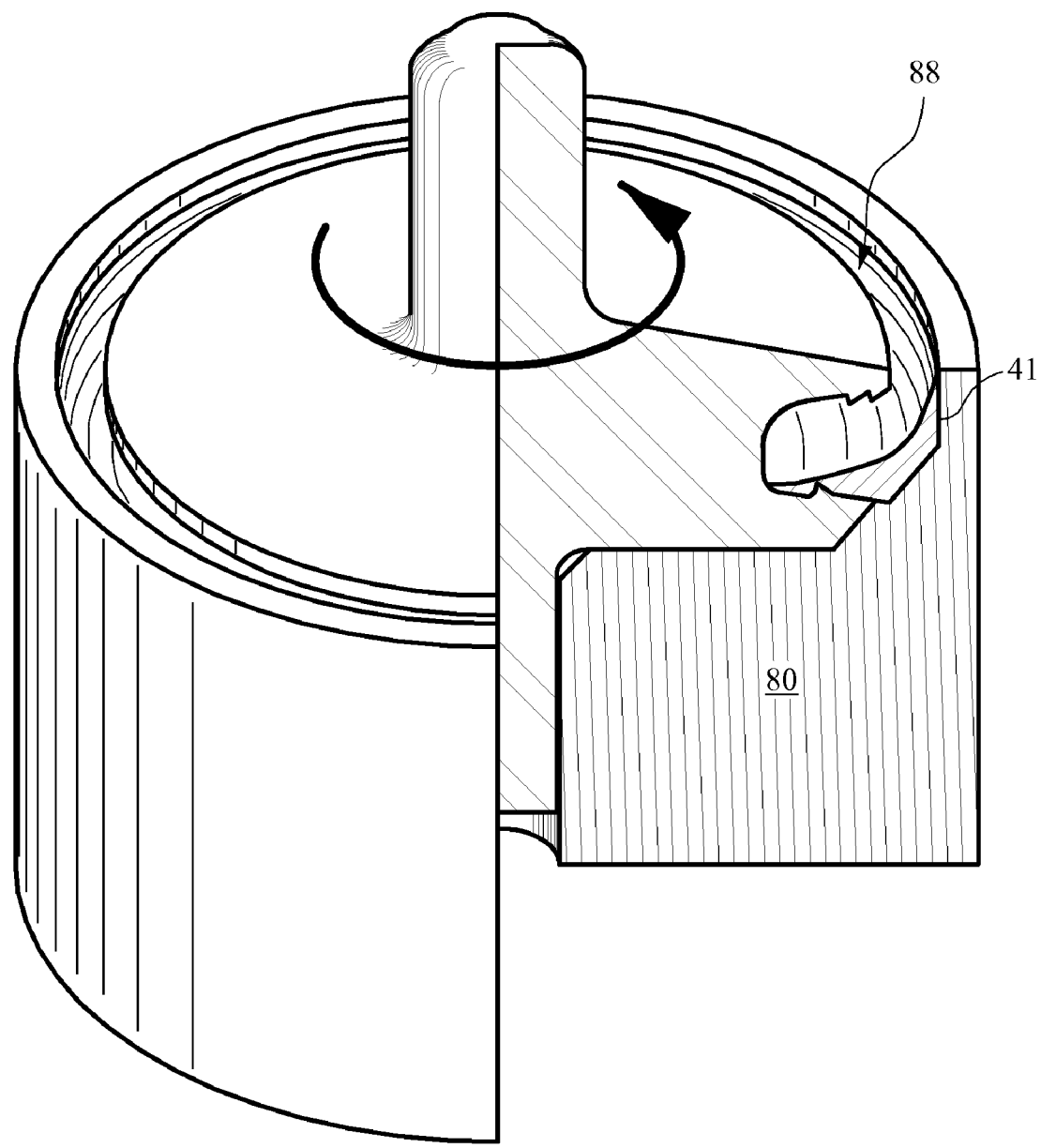
FIG. 4 schematically illustrates a partial cross-section showing curing of the redistributed first polyurethane FIG. 3, the mold rotation indicated in FIG. 3 continuing until the first polyurethane is partially cured.

FIGS. 2A, 2B and 3-5 schematically illustrate various steps in a method of making a valve body and seal assembly 10. The method comprises providing a valve body 20 substantially symmetrical about a longitudinal axis, valve body 20 comprising a circumferential seal retention groove 22 and a frusto-conical valve body impact area 24 for contacting a valve seat (e.g., valve seat 12). The method next comprises providing a mold shell 80 (see FIG. 2A) reversibly coupled to (i.e., reversibly locked to) valve body 20 to form a mold 82 (see, e.g., FIG. 2A) for casting an elastomeric seal in said circumferential seal retention groove. The method next comprises pouring a first liquid elastomer (e.g., polyurethane) 52 in mold 82 to form partially-filled mold 84 (see FIG. 2B). The method next comprises starting rotation of partially filled mold 84 about the longitudinal axis for redistributing first liquid elastomer (e.g., polyurethane) 52 to form a redistributed partially-filled mold 86 (see FIG. 3). Note that rotational speed may change during this step and/or in transition to the following step. For example, an increase in rotational speed can result in a change in the shape of the redistributed elastomer analogous to that seen schematically in FIG. 4, compared to that seen schematically in FIG. 3.

The method next comprises partially curing said first liquid elastomer (e.g., polyurethane) 52 to form a redistributed partially-filled mold 88 (see FIG. 4) containing a partially-cured first seal section 41. The method next comprises stopping the rotation. The method next comprises pouring a second liquid elastomer (e.g., polyurethane) 56 in redistributed partially-filled mold 88 to form a partially-cured seal 39 comprising (partially cured) first seal section 41 and (partially cured) second seal section 43 (see FIG. 5). The method next comprises curing partially-cured seal 39 to form a cured seal 40 (see FIG. 1). Finally, the method next comprises removing mold shell 80 from valve body 20 to make a valve body and seal assembly 10 as shown in FIG. 1.

Figure 6:
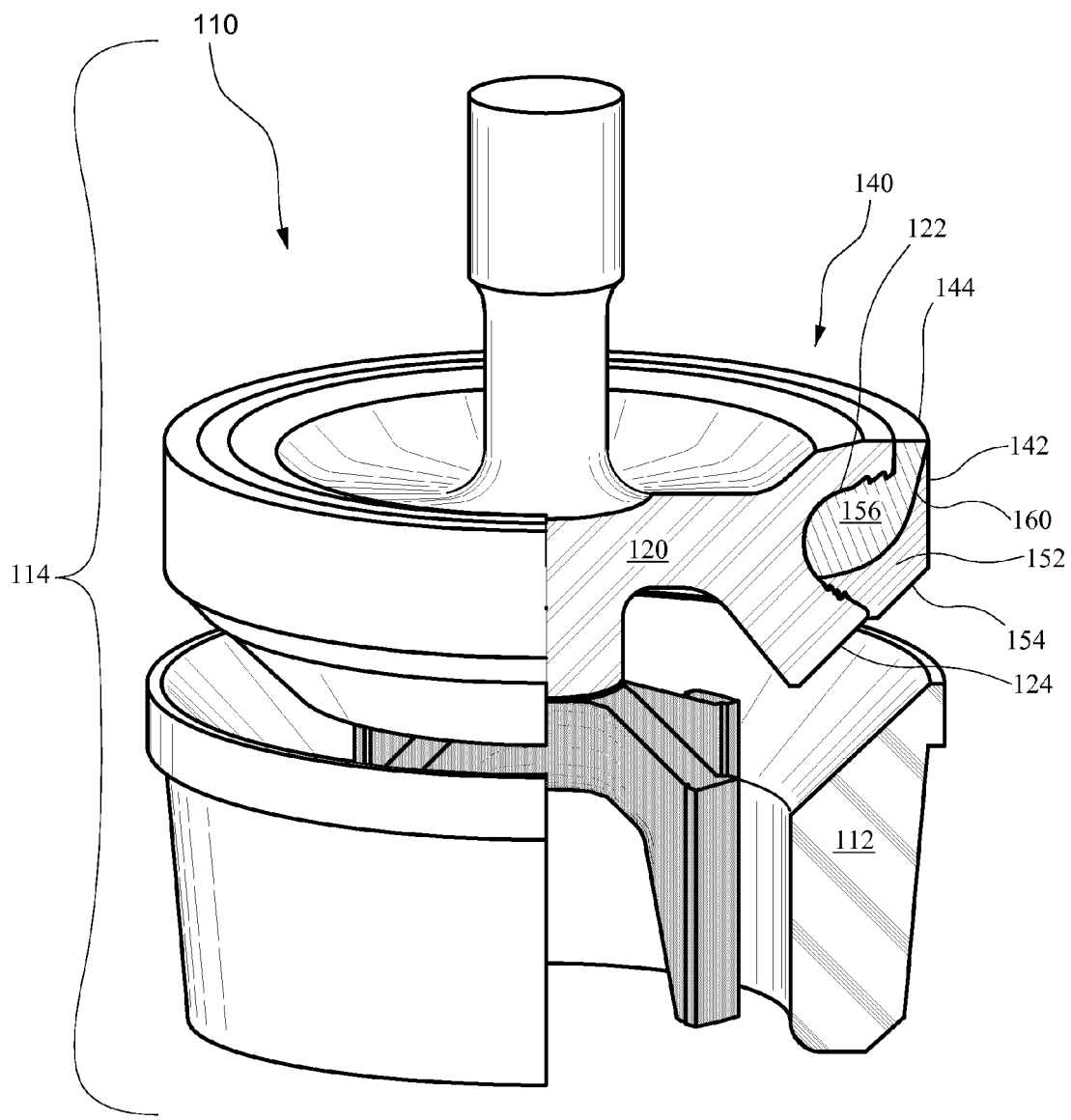
FIG. 6 schematically illustrates a partial cross-section of a full-open valve comprising an alternate valve body and seal assembly analogous-in-part to that shown in FIG. 1, plus a corresponding valve seat.

FIG. 6 schematically illustrates a cross-section of a full-open valve 114 comprising an alternate valve body and seal assembly 110 analogous-in-part to valve body and seal assembly 10 shown in FIG. 1, plus a corresponding valve seat 112. Valve body and seal assembly 110 comprises a valve body 120 substantially symmetrical about a longitudinal axis, valve body 120 comprising a circumferential seal retention groove 122 and a frusto-conical valve body impact area 124 for contacting a valve seat (e.g., valve seat 112). An elastomeric seal 140 is cast-in-place in circumferential seal retention groove 122.

In the illustrated embodiment of FIG. 6, elastomeric seal 140 comprises first and second seal sections 142 and 144 respectively, each seal section being substantially symmetrical about the longitudinal axis. First seal section 142 comprises a first polyurethane 152 and has a frusto-conical external surface portion 154 for contacting a valve seat (e.g., valve seat 112). Second seal section 144 contacts first seal section 142 via a substantially smooth intra-seal interface 160. At least a portion of second seal section 144 lies between a portion of circumferential seal retention groove 122 and at least a portion of first seal section 142. Second seal section 144 comprises a second polyurethane 156 having a lower modulus than first polyurethane 152, and intra-seal interface 160 simultaneously extends radially outward (from the longitudinal axis) and longitudinally. Intra-seal interface 160 is thus non-planar and may comprise one or more curved portions when viewed (in cross-section) in a plane containing the longitudinal axis (see, e.g., FIG. 6). Such curved portions, when present, are variable in slope and length, and they result from the method of making a seal as described herein Note that FIG. 2B schematically illustrates a mold comprising a valve body and a reversibly coupled mold shell, the mold being partially filled with liquid elastomer (first polyurethane) before curing. In various embodiments, the mold may or may not be rotating at the time of this partial filling. As illustrated in FIG. 2B, the mold is not rotating. If the mold were rotating, the mold shell and valve body must have been locked together. If the mold shell and valve body were not locked together and slippage between the mold shell and valve body were to occur, unacceptable shear stresses would occur in the elastomer.

FIG. 3 schematically illustrates the mold shell and valve body locked together and spinning about the longitudinal axis. The top surface of the first polyurethane has taken a substantially parabolic shape. The shape and height of the first polyurethane at the outside edge will be determined by the speed of rotation. The speed of rotation may be varied (e.g., starting slow and increasing rotation speed as the first polyurethane begins to cure).

FIG. 4 schematically illustrates the substantially parabolic shape of the top surface of the first polyurethane if the mold is spun at a relatively higher speed of rotation than that schematically illustrated in FIG. 3.

Figure 5:
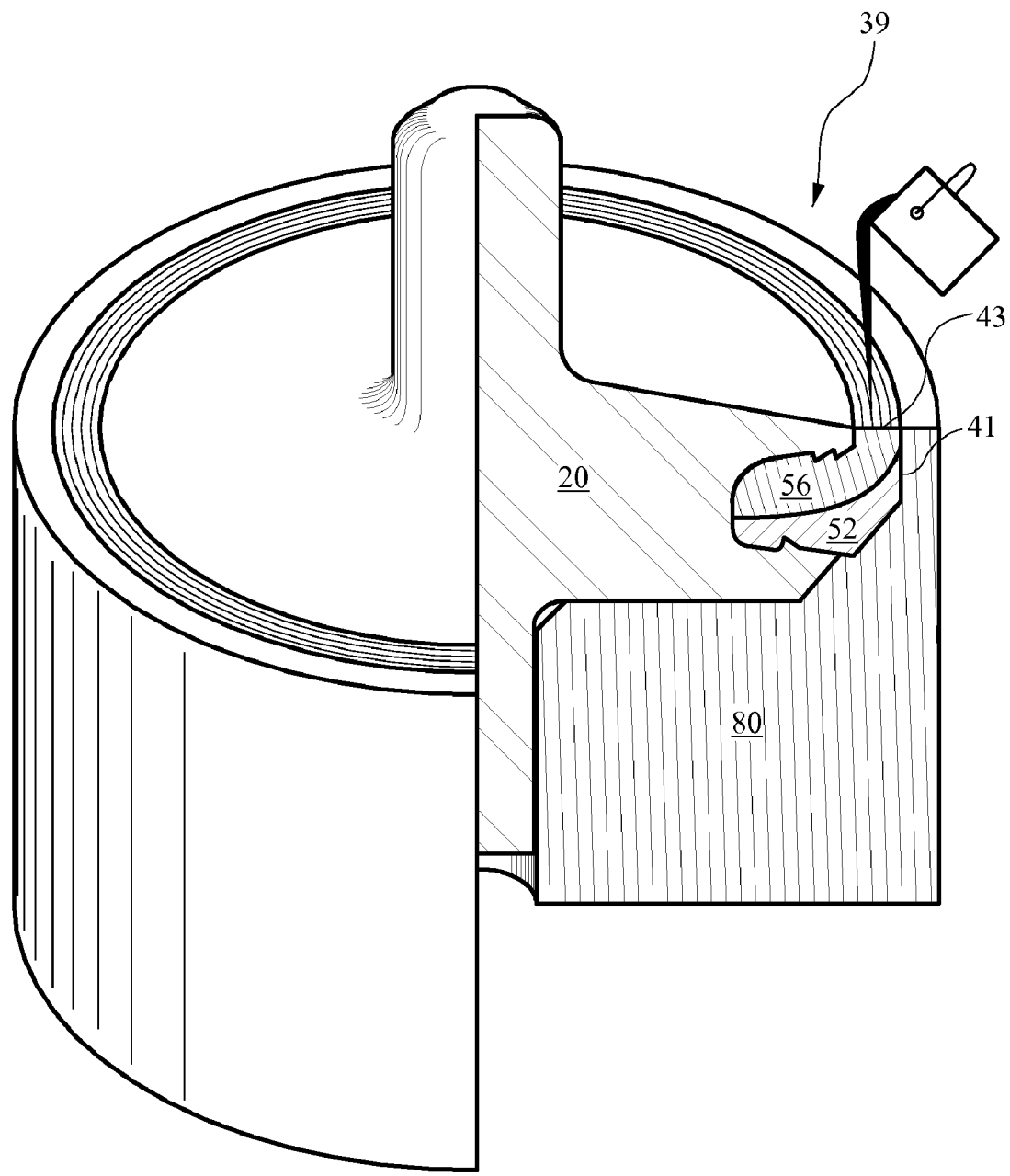
FIG. 5 schematically illustrates a partial cross-section showing placement of a (liquid) second polyurethane for a second seal section in the mold of FIG. 4; after full curing of first and second polyurethanes, removal of the mold shell yields a valve body and seal assembly similar to that shown in FIG. 1.

FIG. 5 schematically illustrates a partially-cured dual-durometer seal (comprising first and second seal sections) after the pouring of a second polyurethane into the mold. Achieving an optimum strength dual-durometer seal is a function of the timing of pouring of the second polyurethane. The second polyurethane should be poured just as the first polyurethane starts to harden or take a permanent set. At this time, the molecules of the second polyurethane will cross-link with molecules of the first polyurethane, and an optimal bond will develop between the two polyurethanes. That is, the overall strength of the entire dual-durometer seal will be optimized. This strength optimization will not take place if the first polyurethane is allowed to completely cure before pouring of the second polyurethane. Thus the optimized valve body and seal assembly described herein combines the advantages of a cross-linked dual-durometer seal with the advantages of a non-planar intra-seal interface between the first and second seal sections. See FIGS. 1 and 6 for schematically illustrative examples of such an optimized valve body and seal assembly.

Each elastomeric seal configuration in the valve body and seal assemblies described herein confers operational advantages that may have relatively greater importance in certain applications. In the seal configuration shown in FIG. 6, the edge of a portion of the intra-seal interface is seen in section to be nearly vertical (meaning the portion has a more cylindrical character) than the analogous edge of the alternate embodiment shown in FIG. 1. Thus, the shear component of residual elastomer shrinkage stress at the major portion of the interface of FIG. 6 would tend to be less than the shear component of residual elastomer shrinkage stress in the alternate embodiment of FIG. 1. On the other hand, the intra-seal interface configuration of the alternate embodiment of FIG. 1 would minimize transmission of any shear component of stresses secondary the pressure forces associated with valve closure.

Thus, a preferred distribution of elastomer stress for a certain elastomeric seal configuration may be influenced by specification of the relationships of portions of the intra-seal interface to each other and/or to other surfaces in the valve body and seal assembly as, for example, coaxial, geometrically similar (different size, same angular orientation), geometrically non-similar (different size, different angular orientation), or geometrically congruent (same size, same angular orientation). Adjustment of the interrelationships of such surfaces and/or portions in a particular valve body and seal assembly configuration to optimize performance (e.g., seal preload, leakage control, and/or susceptibility to extrusion damage) in a particular application is a problem in multivariate analysis that can be addressed using well-known techniques. Illustrative examples represented by the embodiments described herein constitute a sampling of typical design constraints.

Mold surfaces coming into contact with the elastomer(s) as a seal section is cast-in-place are typically chosen and/or prepared so as to inhibit adhesion of the elastomer to each such surface, rather than to encourage bonding. Adhesion-inhibiting properties of a mold-elastomer interface may be obtained by appropriate choice of materials for the mold and the elastomer, and/or by subsequent treatment of these materials. For example, if a valve body is quenched in oil after heat-treatment (e.g., carburization), a thin layer of the quenching oil may be retained on the seal retention groove after quenching is completed for treating the groove to increase its adhesion-inhibiting properties. An adhesion-inhibiting seal retention groove may also be prepared, for example, by polishing the groove and/or by the applying to the groove one or more layers of non-stick materials such as oils, greases, waxes or plastics having properties similar to Teflon®. In each case, an elastomeric seal cast-in-place in contact with adhesion-inhibiting surfaces preferably exhibits minimal or no adherence to such surfaces during curing. That is, forces due to adhesion of the elastomer to mold surfaces, if present, will not materially add to the elastomer's background stress and thus will not materially reduce service life.

Valve body and seal assemblies disclosed herein may optionally comprise circular serrations of predetermined height on first and/or second opposing walls of a circumferential seal retention groove that is spaced apart from the valve body longitudinal axis. Serrations (or groups of serrations) on the first and/or second opposing walls may be located at different distances from the longitudinal axis. Where a plurality of serrations are grouped on one or both of the opposing groove walls, distance from the longitudinal axis attributed to a serration group is the mean distance from the longitudinal axis for serrations within that group.

First opposing walls of the circumferential seal retention grooves on valve bodies are closer than second opposing walls to an area of high impact loads because they are closer to a peripheral metal sealing surface (valve body impact area) on the valve body flange. Thus, the periphery of first opposing walls is subject to relatively higher impact stress than other parts of the opposing groove walls when the valve body strikes the valve seat.

Second opposing walls, while more distant from the site of maximum metal-to-metal impact stress than first opposing walls, nevertheless experience significant bending stress due to forces transmitted to them through the seal. This bending stress on the second opposing groove wall is lowest peripherally and highest centrally (i.e., highest in that part of the wall that is closest to the longitudinal axis of the valve body). The area of maximum bending stress on second opposing groove walls is more central than the area of maximum metal-to-metal impact stress on first opposing walls because second opposing walls are effectively cantilevered peripherally from the most centrally located area of the seal retention groove.

Because the periphery of first opposing walls sustains relatively high impact stress, serrations on first opposing walls are preferably located as far centrally on such groove walls as practicable to maximize the distance from the impact area and thus minimize stress build-up near the serrations (which act as stress raisers). In a stem-guided valve body having a longitudinal axis of symmetry, for example, this means that serrations on first opposing walls are located as close as practicable to the longitudinal axis of symmetry (i.e., relatively centrally in the seal retention groove).

On the other hand, the bending stress acting on the second opposing wall of an integral seal retention groove on a stem-guided valve body will typically be greatest near the portion of the second opposing wall nearest the longitudinal axis of symmetry. Hence, for the stem-guided valve body and seal assemblies described herein, serrations on second opposing walls are located as far as practicable from the longitudinal axis of symmetry (i.e., peripherally, relative to the centrally-placed serrations on the first opposing walls as noted above).

Serrations (or serration groups) on first and second groove walls are therefore offset. Serration offset, in turn, minimizes the detrimental stress-raising effects of the serrations on their respective valve body flange areas. Additionally, use of offset serrations means that retaining forces exerted on an elastomeric seal in a groove by serrations on the opposing groove walls are further spaced apart as a function of the offset distance. This further spacing apart adds to the separation of forces acting on the seal and thus reduces stress concentration in the seal elastomer that would tend to tear the seal apart. Reduced stress concentration, in turn, results in reduced elastomer stress for valve body and seal assemblies disclosed herein.

Note that curvature of groove walls toward the center of the groove is allowable if the resulting curved wall would not trap air bubbles in liquid elastomer when the valve body is in position for casting of a seal in the groove.

What is claimed is:

1. A valve body and seal assembly having a longitudinal axis, said valve body and seal assembly comprising:
   a valve body substantially symmetrical about said longitudinal axis, said valve body comprising a circumferential seal retention groove and a frusto-conical valve body impact area for contacting a valve seat; and
   an elastomeric seal cast-in-place in said circumferential seal retention groove, said elastomeric seal comprising:
      a first seal section substantially symmetrical about said longitudinal axis and having a frusto-conical external surface portion for contacting a valve seat, said first seal section comprising a first polyurethane; and
      a second seal section substantially symmetrical about said longitudinal axis and contacting said first seal section via a substantially smooth intra-seal interface, at least a portion of said second seal section lying between a portion of said circumferential seal retention groove and at least a portion of said first seal section, said second seal section comprising a second polyurethane having a lower modulus than said first polyurethane;
   wherein said intra-seal interface simultaneously extends radially outward and longitudinally.

2. The valve body and seal assembly of claim 1, wherein said first seal section first polyurethane is crosslinked with said second seal section second polyurethane.

3. The valve body and seal assembly of claim 1, wherein said first seal section additionally comprises a cylindrical external surface portion.

4. The valve body and seal assembly of claim 1, wherein said first seal section frusto-conical external surface portion is geometrically similar to said frusto-conical valve body impact area.

5. The valve body and seal assembly of claim 1, wherein said first seal section comprises polyurethane of about 95 durometer Shore A hardness to about 60 durometer Shore D hardness.

6. The valve body and seal assembly of claim 5, wherein said second seal section comprises polyurethane of about 75 to about 85 durometer Shore A hardness.

7. The valve body and seal assembly of claim 1, wherein said second seal section comprises a substantially planar external surface portion.

8. The valve body and seal assembly of claim 1, wherein said second seal section comprises a substantially non-planar external surface portion.

9. A valve comprising the valve body and seal assembly of claim 1 and a valve seat.

10. A valve comprising the valve body and seal assembly of claim 6 and a valve seat.

* * * * *